US008387882B2

(12) United States Patent
Kearney et al.

(10) Patent No.: US 8,387,882 B2
(45) Date of Patent: Mar. 5, 2013

(54) DECODABLE INDICIA READING TERMINAL WITH A PLATTER TO INHIBIT LIGHT REFLECTION

(75) Inventors: Sean Philip Kearney, Marlton, NJ (US); Patrick Anthony Giordano, Glassboro, NJ (US); Timothy Good, Clementon, NJ (US); Justin Samek, Voorhees, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

(21) Appl. No.: 13/178,465

(22) Filed: Jul. 7, 2011

(65) Prior Publication Data

US 2013/0008963 A1  Jan. 10, 2013

(51) Int. Cl.
  *G06K 7/10* (2006.01)
(52) U.S. Cl. .................. 235/455; 235/454; 235/462.14
(58) Field of Classification Search .................. 235/383, 235/462.01–472.03
See application file for complete search history.

(56) References Cited

U.S. PATENT DOCUMENTS

| | | | |
|---|---|---|---|
| 5,834,708 A | 11/1998 | Svetal et al. | |
| 5,993,023 A | 11/1999 | Lin | |
| 6,237,852 B1 | 5/2001 | Svetal et al. | |
| 6,457,644 B1 * | 10/2002 | Collins et al. | 235/462.14 |
| 7,191,947 B2 * | 3/2007 | Kahn et al. | 235/462.41 |
| 7,740,175 B2 | 6/2010 | Good | |
| 7,780,086 B2 | 8/2010 | Barkan et al. | |
| 7,880,938 B2 * | 2/2011 | Shiraishi | 358/474 |
| 2004/0195331 A1 * | 10/2004 | Imai et al. | 235/454 |
| 2006/0181698 A1 * | 8/2006 | Treves et al. | 356/237.2 |
| 2007/0095919 A1 | 5/2007 | Detwiler et al. | |
| 2007/0290043 A1 * | 12/2007 | Russell et al. | 235/462.14 |
| 2009/0001166 A1 * | 1/2009 | Barkan et al. | 235/462.14 |
| 2009/0084856 A1 | 4/2009 | Vinogradov et al. | |
| 2010/0139989 A1 * | 6/2010 | Atwater et al. | 177/245 |
| 2010/0140357 A1 | 6/2010 | Roslak et al. | |
| 2010/0163627 A1 | 7/2010 | Olmstead | |

* cited by examiner

*Primary Examiner* — Tuyen K Vo
(74) *Attorney, Agent, or Firm* — Heslin Rothenberg Farley & Mesiti P.C.

(57) ABSTRACT

A decodable indicia reading terminal for reading a substrate bearing decodable indicia may include an imager-based scanner and a platter. The imager-based scanner may be disposed within a housing and include a multiple pixel image sensor and an imaging lens configured to focus an image on the decodable indicia on the image sensor. The platter may be on the housing, the platter may surround the image-based scanner, and the platter may have a texturized surface. The texturized surface of the platter may reduce the amount light being perceived when the light is reflected from the texturized surface compared to a platter having a brushed surface aligned in a substrate motion direction.

19 Claims, 4 Drawing Sheets

DECODABLE INDICIA READING TERMINAL WITH A PLATTER TO INHIBIT LIGHT REFLECTION

FIELD OF THE INVENTION

This invention relates generally to decodable indicia reading terminals and, more specifically, to optical indicia reading terminals including a platter for controlling the amount of light reflected.

BACKGROUND OF THE INVENTION

The use of optical indicia, such as bar code symbols, for product and article identification is well known in the art. Presently, various types of indicia reading terminals have been developed, such as hand-held bar code scanners, hands-free scanners, bi-optic in-counter scanners, and mobile computers such as personal digital assistants (PDAs).

One common type of scan engine found in hand-held and retail scanners is the laser-based scan engine, which uses a focused laser beam to sequentially scan the bars and spaces of a bar code symbol pattern to be read. As the laser beam is scanned across the bar code symbol, a portion of the reflected light beam is collected by optics within the scanner. The collected light signal can subsequently be focused upon a photo-detector within the scanner. The photo-detector can, in one example, generate an analog electrical signal which can be converted into a digital signal representative of the bar code symbol.

Another common type of indicia reading terminal is the digital imager, which includes 1D (linear) imagers and 2D (area) imagers. Digital imagers typically utilize light emitting diodes (LEDs) and a lens to focus the image of the bar code onto a multiple pixel image sensor, which is often provided by a complementary metal-oxide semiconductor (CMOS) image sensor that converts light signals into electric signals. The LEDs simultaneously illuminate all of the bars and spaces of a bar code symbol with light of a specific wavelength in order to capture an image for recognition and decoding purposes.

In current applications, the indicia reading terminal may include a platter, the platter located on a housing. There may be a particular direction for moving products or substrates in order to scan them. The surface of the platter may have brush strokes. The brush strokes may be oriented in the same direction as the direction for moving products or substrates. However, there may be a glare or other unpleasant reflection of light from the platter. Accordingly, there is a need for further development of decodable indicia reading terminals and optical indicia reading terminals.

SUMMARY OF THE INVENTION

In a first aspect, the decodable indicia reading terminal for reading a substrate bearing decodable indicia includes an imager-based scanner and a platter. The imager-based scanner may be disposed within a housing and include a multiple pixel image sensor and an imaging lens configured to focus an image on the decodable indicia on the image sensor. The platter may be on the housing and the platter may have a texturized surface. The texturized surface of the platter may reduce the amount light, which may be light directed at the texturized surface, light from another light source, and/or ambient light, being perceived when the light is reflected from the texturized surface compared to a platter having a brushed surface aligned in a substrate motion direction.

In a second aspect, the decodable indicia reading terminal for reading a substrate bearing decodable indicia includes a laser-based scanner disposed within a housing, an imager-based scanner disposed within the housing, a central processing unit, and a platter on the housing. The laser-based scanner may include a laser source configured to emit a laser beam onto the substrate bearing decodable indicia, a photo-detector configured to receive a second beam of a variable intensity reflected by the decodable indicia and to output a first analog signal representative of the variable intensity, and a first analog-to-digital converter configured to convert the first analog signal into a first digital signal representative of the first analog signal. The imager-based scanner may include a multiple pixel image sensor, an imaging lens configured to focus an image of the decodable indicia on the image sensor, and a second analog-to-digital converter configured to convert a second analog signal into a second digital signal read out of the image sensor, the second analog signal representative of light incident on the image sensor and the second digital signal representative of the second analog signal. The central processing unit may be configured to output a decoded message data corresponding to the decodable indicia by processing at least one of the first digital signal or the second digital signal. The platter may have a texturized surface. The texturized surface of the platter may reduce the amount of light, which may be light directed at the texturized surface, light from another external source, and/or ambient light, being perceived when the light is reflected from the texturized surface compared to a platter having a brushed surface aligned in a substrate motion direction.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

FIG. 1A is a cross sectional view of a light bar housing of the decodable indicia reading terminal, in accordance with an aspect of the invention;

DETAILED DESCRIPTION OF THE INVENTION

One of the key challenges for bar code scanning and imaging is the requirement of intense illumination. The magnitude of illumination intensity is directly correlated to the motion tolerance performance of the bar code scanning device. Laser and/or imaging scanning devices demand that the embedded imager perform with extremely high motion tolerance but yield the lowest illumination intensity possible.

Figure 1:
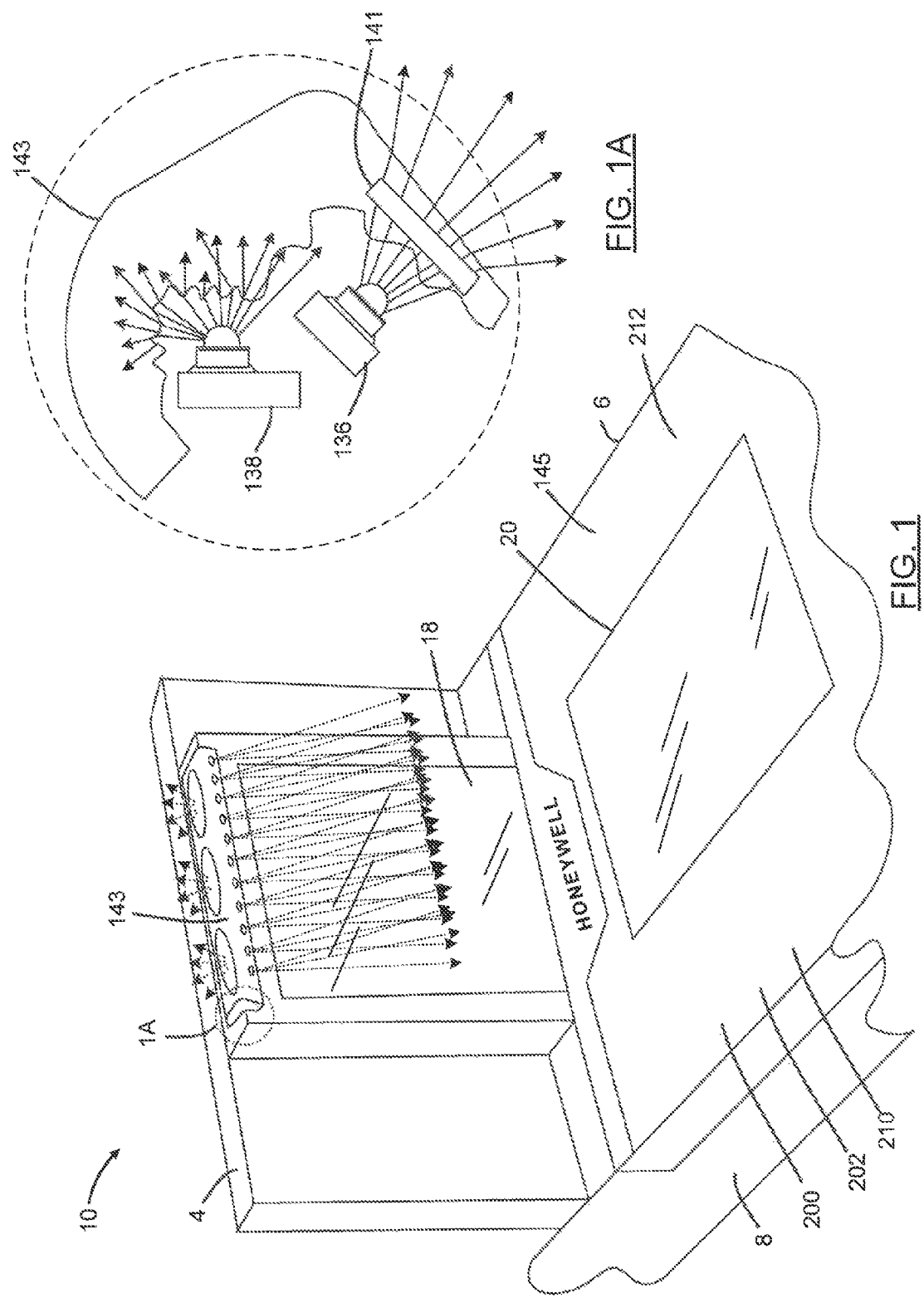
FIG. 1 is a perspective view of a decodable indicia reading terminal, in accordance with an aspect of the invention.

In one embodiment, there is provided a decodable indicia reading terminal 10 shown in FIG. 1. The decodable indicia reading terminal 10 may include a first scanning window 18 and a second scanning window 20. The first scanning window 18 may be positioned in a first section 4 of scanning terminal housing 8, while the second scanning window 20 may be positioned in a second section 6 of scanning terminal housing 8. As illustrated, the first scanning window 18 and second scanning window 20 may be substantially orthogonal to each other. In some embodiments, the first scanning window 18 and second scanning window 20 may be arranged side by side, or the first scanning window 18 and second scanning window 20 may be arranged at an angle less than 90° with respect to each other.

In a further aspect, the decodable indicia reading terminal 10 may comprise a laser-based scanner which may be located behind the first scanning window 18 or the second scanning window 20.

In a further aspect, the decodable indicia reading terminal 10 may further comprise a one-dimensional (1D) or two-dimensional (2D) imager-based scanner which may be located behind one of the scanning windows 18, 20. Although described herein as having both an imager-based scanner and a laser-based scanner, the decodable indicia reading terminal may include only an imager-based scanner.

Figure 2:
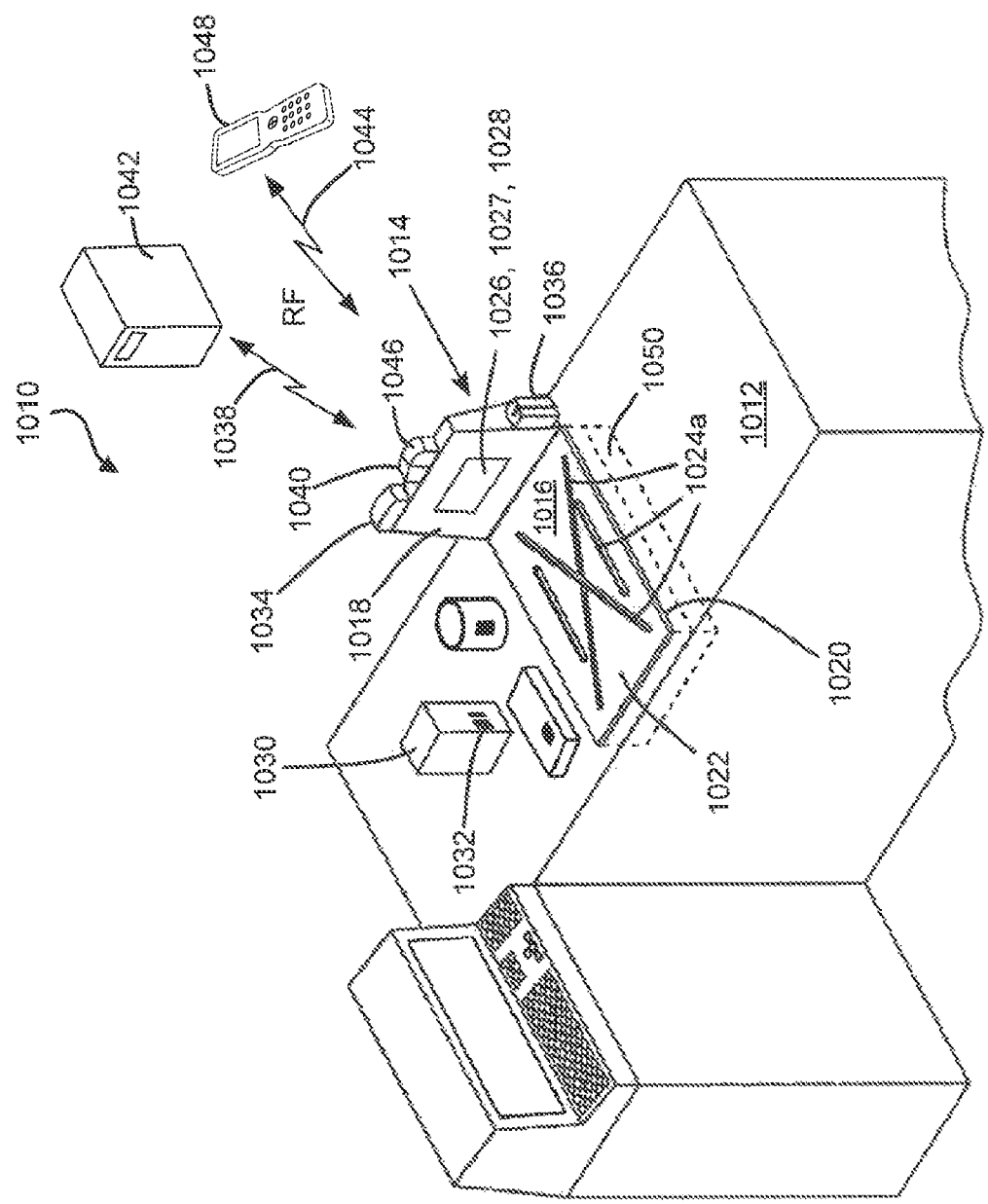
FIG. 2 is a perspective view of the decodable indicia reading terminal incorporated into a point-of-sale workstation comprising a decodable indicia reading terminal, in accordance with an aspect of the invention.

In one embodiment, the decodable indicia reading terminal may be incorporated into a point-of-sale workstation 1010 used by retailers to process purchase transactions involving products bearing decodable indicia, e.g., a UPC symbol, as shown in FIG. 2. The point-of-sale workstation 1010 may include a horizontal countertop 1012 for placement of products to be scanned. A decodable indicia reading terminal provided by a bi-optic scanner 1014 may be mounted within the countertop 1012. The bi-optic scanner 1014 may include a horizontally-disposed housing portion 1016 and a vertically disposed housing portion 1018 which may project from one end of the horizontally-disposed housing portion 1016 in a substantially orthogonal manner.

In one embodiment, the horizontally-disposed housing portion 1016 may comprise a first laser-based indicia scanner and the vertically-disposed housing portion 1018 may comprise a second laser-based indicia scanner and an imager-based scanner. The laser-based indicia scanner may be a linear imager with laser-based illumination or polygon-based laser scanner. The countertop 1012 may include an optically transparent (e.g., glass) horizontal-scanning window 1020 which may be mounted flush with the checkout counter, and may be covered by an imaging window protection plate 1022 having a pattern of apertures 1024a. These apertures 1024a permit the projection of a plurality of illumination planes from the first laser-based scanner located beneath the horizontal-scanning window 1020. In embodiments utilizing polygon based laser scanners, apertures 1024a may be omitted and the illumination planes would be replaced by scanning laser rasters. The vertically-disposed housing portion 1018 of the bi-optic scanner 1014 may further include a vertical-scanning window 1026 behind which the second laser-based scanner 1027 and the imager-based scanner 1028 may be housed.

In another embodiment, a second imager-based scanner may be disposed behind the horizontal scanning window 1020. The foregoing arrangements are not intended to be exclusive, and there are other ways of disposing the scanners and scanning windows that are within the scope of this disclosure.

A product 1030 having decodable indicia 1032 may be scanned by the bi-optic scanner 1014. If the decodable indicia 1032 is located on the bottom of the product 1030, one or more of the scan lines projected through the horizontal-scanning window 1020 may traverse the decodable indicia for decoding. If the decodable indicia 1032 is located on the side of the product, then an image of the decodable indicia may be captured by the imager-based scanner 1028 and processed for decoding, and/or one or more of the scan lines projected through the horizontal or vertical scanning windows from one of the laser-based scanners may traverse the decodable indicia for decoding.

As used herein, "decodable indicia" is intended to denote a representation of a message, such as the representation in a bar code symbology of a character string comprising alphanumeric and non-alphanumeric characters. Decodable indicia may be used to convey information, such as the identification of the source and the model of a product, for example in a UPC bar code that comprises twelve encoded symbol characters representing numerical digits.

In one embodiment, the workstation 1010 may further include a radio frequency identification (RFID) reader 1034; a credit card reader 1036; a wide-area wireless (WIFI) interface 1038 including RF transceiver and antenna 1040 for connecting to the TCP/IP layer of the Internet as well as one or more storing and processing relational database management system (RDBMS) server 1042; a Bluetooth 2-way communication interface 1044 including RF transceivers and antenna 1046 for connecting to Bluetooth-enabled hand-held scanners, imagers, PDAs, portable computers and the like 1048, for control, management, application and diagnostic purposes. The workstation 1010 may further include an electronic weight scale module 1050 employing one or more load cells positioned centrally below the system's structurally rigid platform for bearing and measuring substantially all of the weight of objects positioned on the horizontal-scanning window 1020 or window protection plate 1022, and generating electronic data representative of measured weight of such objects.

The bi-optic scanner configuration described herein supra is exemplary, and is not limited to a construction having horizontal and vertical scan windows. In another embodiment, a bi-optic scanner may include a single scan window, with a laser-based scanner and/or an imager-based scanner disposed behind it. Other arrangements of the laser-based scanner and imager-based scanner within the housing of the decodable indicia reading terminal and relative to one or more scanning windows are within the scope of this disclosure.

Figure 3:
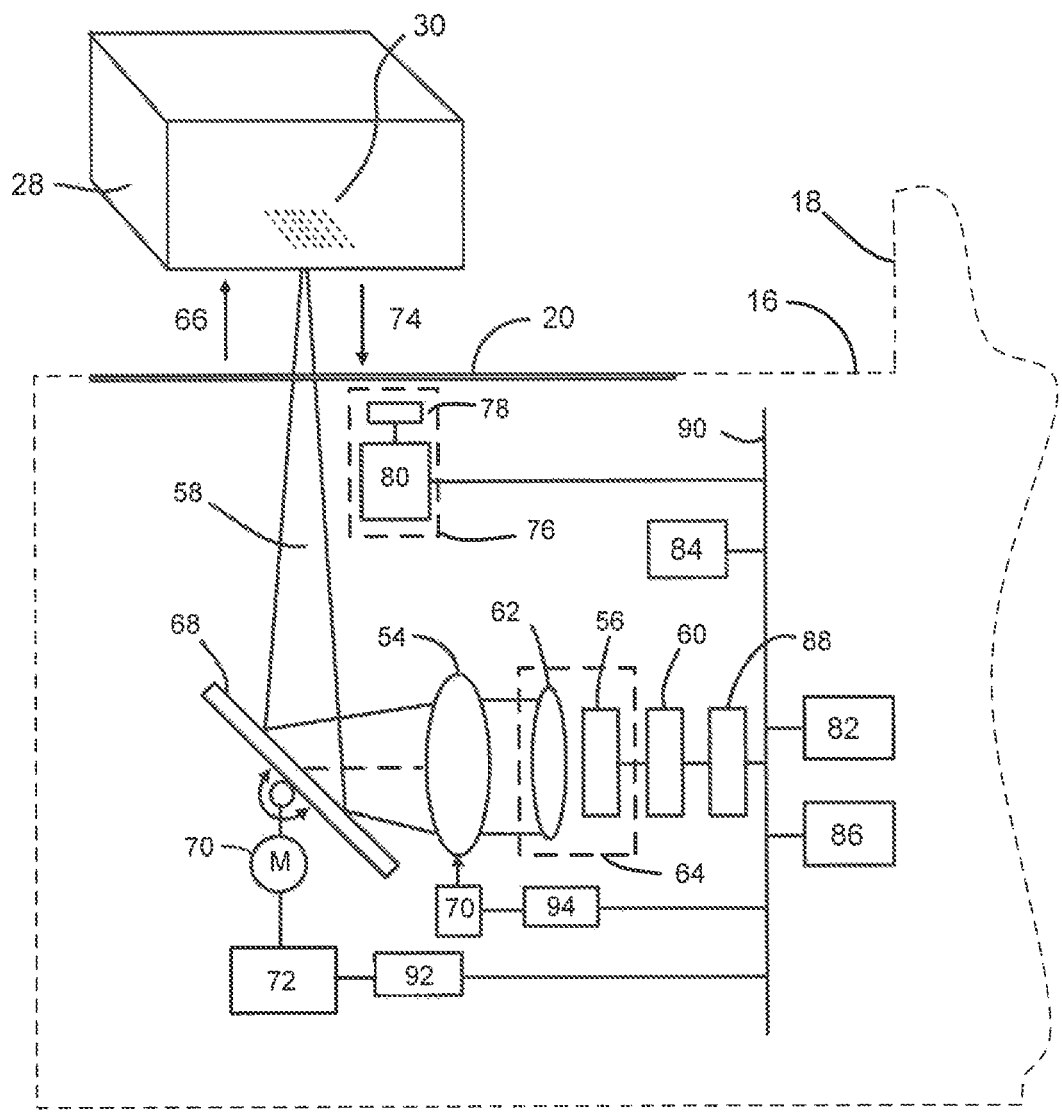
FIG. 3 is a component diagram of a laser-based scanner which may be incorporated in one embodiment of the indicia reading terminal, in accordance with an aspect of the invention.

FIG. 3 illustrates a component diagram of a laser-based scanner which may be incorporated in one embodiment of the indicia reading terminal 10 of FIG. 1. The laser-based scanner 12 may comprise a lens assembly 54, which may include a fixed lens, a variable position lens holder adapted for use with a moveable lens system, or a variable focus fluid lens, for example. The laser scanner 12 may further comprise a laser source 56 which may emit a laser beam. The laser source 56 may be coupled to a laser source control circuit 60. Light from the laser source 56 may be shaped by the collimating optics 62 and the lens assembly 54. The combination of the laser source 56 and the collimating optics 62 may be regarded as a laser diode assembly 64. The laser beam emitted by the laser source 56 may illuminate the substrate 28, which in one embodiment may bear the decodable indicia 30. A scanning mirror reflector 68 disposed within the optical path of the laser beam emitter by the laser source 56 can oscillate to direct the laser beam across the entire surface to be scanned. Reflector 68 may be driven by a scan motor 70 which may be coupled to control circuit 72.

The laser beam emitted by the laser source 56 may reflect off the product 28 and then travel back to the photo-detector assembly 76. In the example wherein the product 28 includes a bar code, the incident laser light may be reflected by areas of dark and white bands. The reflected beam may thus have variable intensity representative of the bar code pattern. Photo-detector assembly 76 including photo-detector 78 and analog-to-digital (A/D) converter 80 may receive the reflected beam of variable intensity, generate an analog signal corresponding to the reflected beam, and convert it to a digital signal representative of the beam intensity for storage into memory 82 where it may be processed by CPU 84 in accordance with a program stored in the non-volatile memory 86, provided in a particular example by an EPROM.

For attempting to decode a bar code symbol, CPU 84 may process a digital signal corresponding to the reflected laser beam to determine a spatial pattern of dark cells and light cells and may then convert each light and dark cell pattern determined into a character of character string via table lookup, and may output a decoded message data corresponding to the decodable indicia.

In a further aspect, laser scanner 12 may include various interface circuits allowing CPU 84 to communicate with various circuits of scanner 12 including first interface circuit 88 coupled to laser source control circuit 60 and system bus 90, second interface circuit 92 coupled to motor control circuit 72, and third interface circuit 94 coupled to electrical power input unit 96.

Figure 4:
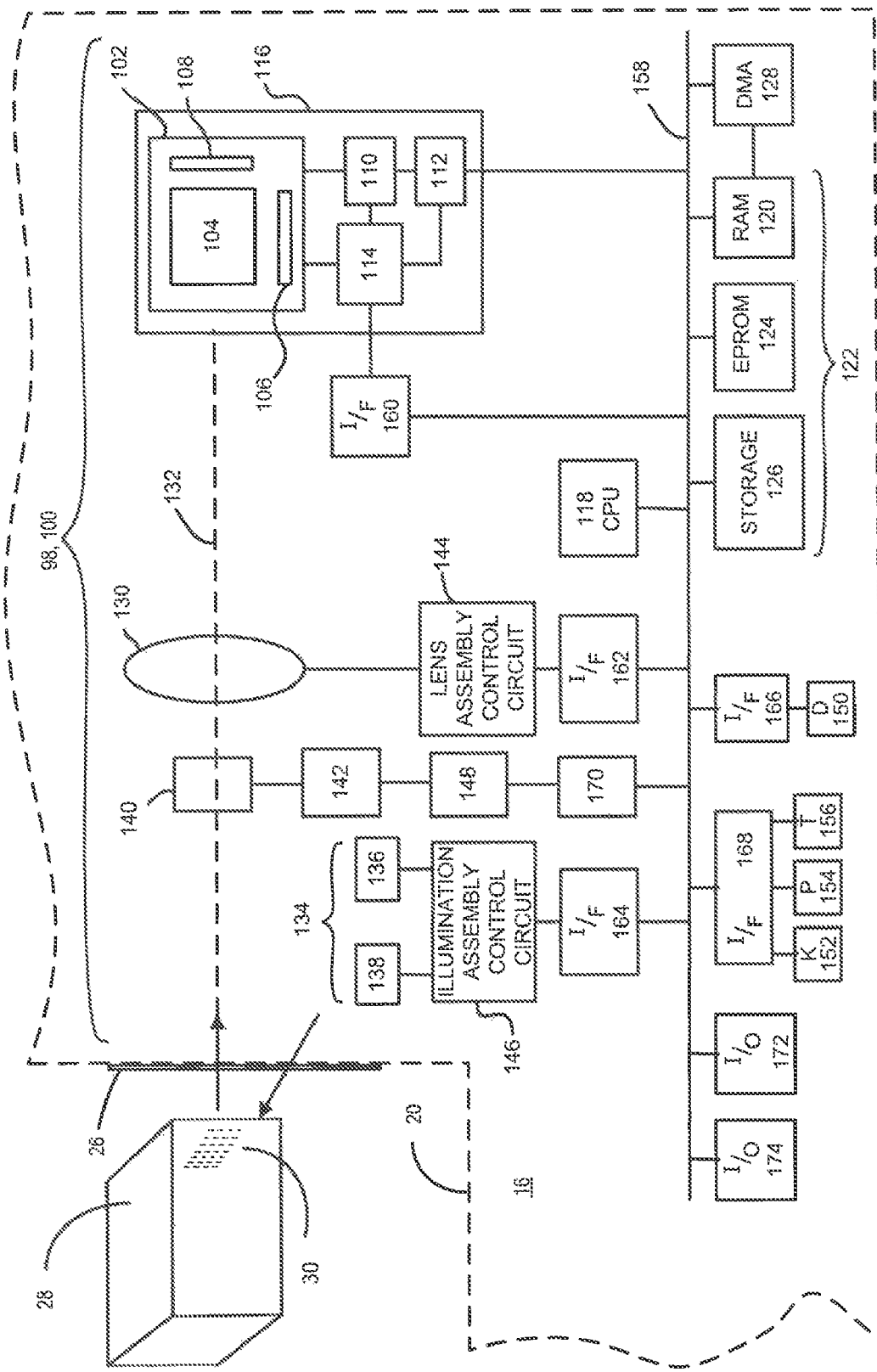
FIG. 4 is a component diagram of an imager-based scanner which may be incorporated in one embodiment of the indicia reading terminal, in accordance with an aspect of the invention.

Referring now to FIG. 4, a component diagram of an imager-based scanner may be incorporated in one embodiment of the indicia reading terminal 10 of FIG. 1. The imager-based scanner 98 may comprise a multiple pixel image sensor assembly 100, or optical imager, such as a CCD image sensor or a CMOS image sensor.

The image sensor assembly 100 may include an image sensor 102 comprising a multiple pixel image sensor 104 having pixels arranged in rows and columns of pixels, column circuitry 106, and row circuitry 108. Associated with the image sensor 102 may be amplifier circuitry 110, and an A/D converter 112 which may convert image information in the form of analog signals read out of multiple pixel image sensor 104 into image information in the form of digital signals. Image sensor 102 may also have an associated timing and control circuit 114 for use in controlling, e.g., the exposure period of image sensor 102, and/or gain applied to the amplifier 110. The noted circuit components 102, 110, 112, and 114 may be packaged into a common image sensor integrated circuit 116.

In one embodiment, image sensor integrated circuit 116 may incorporate a Bayer pattern filter, and CPU 118 prior to subjecting a frame to further processing may interpolate pixel values for development of a monochrome frame of image data.

In the course of operation of the image sensor assembly 100, image signals may be read out of image sensor 102, converted and stored into a system memory such as RAM 120. A memory 122 of image sensor assembly 100 may include RAM 120, a nonvolatile memory such as EPROM 124, and a storage memory device 126 such as may be provided by a flash memory or a hard drive memory. In one embodiment, image sensor assembly 100 may include CPU 118 which may be adapted to read out image data stored in memory 122 and subject such image data to various image processing algorithms. Image sensor assembly 100 may include a direct memory access unit (DMA) 128 for routing image information read out from image sensor 102 that has been subject to conversion to RAM 120. In another embodiment, image sensor assembly 100 may employ a system bus providing for bus arbitration mechanism (e.g., a PCI bus) thus eliminating the need for a central DMA controller. Other embodiments of the system bus architecture and/or direct memory access components providing for efficient data transfer between the image sensor 102 and RAM 120 are within the scope of this disclosure.

In a further aspect, the image sensor assembly 100 may include an imaging lens assembly 130 for focusing an image of the decodable indicia 30 onto image sensor 102. Imaging light rays may be transmitted about an optical axis 132. Lens assembly 130 may be controlled with use of lens assembly control circuit 144. Lens assembly control circuit 144 may send signals to lens assembly 130, e.g., for changing a focal length and/or a best focus distance of lens assembly 130.

The image sensor assembly 100 may further include a filter module 140 that comprises one or more optical filters, as well as in some embodiments an actuator assembly 142 that may be coupled generally to the filter module, such as to the optical filters. The filter module 140 may be located on either side of the imaging lens assembly 130. Likewise, one or more of the optical filters within the filter module 140 may be disposed on one or more surfaces of the imaging lens assembly 130 and/or the image sensor 102. Filter module 140 may be controlled with use of a filter module control circuit 148, which may be coupled to the actuator assembly 142.

Although not incorporated in the illustrated embodiments, image sensor assembly 1000 may also include a number of peripheral devices such as display 150 for displaying such information as image frames captured with use of image sensor assembly 1000, keyboard 152, pointing device 154, and trigger 156 which may be used to make active signals for activating frame readout and/or certain decoding processes.

Image sensor assembly 1000 may include various interface circuits for coupling several of the peripheral devices to system address/data bus (system bus) bus 158, for communication with second CPU 1188 which may also be coupled to system bus 158. Image sensor assembly 100 may include interface circuit 160 for coupling image sensor timing and control circuit timing and control circuit 114 to system bus 158, interface circuit 162 for coupling the lens assembly control circuit 144 to system bus 158, interface circuit 164 for coupling the illumination assembly control circuit 146 to system bus 158, interface circuit 166 for coupling the display 150 to system bus 158, interface circuit 168 for coupling keyboard 152, pointing device 154, and trigger 156 to system bus 158, and interface circuit 170 for coupling the filter module control circuit 148 to system bus 158.

In a further aspect, image sensor assembly 1000 may include one or more I/O interfaces 172, 174 for providing communication with external devices (e.g., a cash register server, a store server, an inventory facility server, a image sensor assembly 100, a local area network base station, a cellular base station). I/O interfaces 172, 174 may be interfaces of any combination of known computer interfaces, e.g., Ethernet (IEEE 802.3), USB, IEEE 802.11, Bluetooth, CDMA, and GSM.

In order to capture an image by the imager-based scanner 98, the decodable indicia bearing substrate generally needs to be illuminated with a high intensity illumination in order to decrease the required exposure time. While integration of an imager-based scanner into a laser scanner-based system may compensate for known laser-based scanner shortcomings and improve the overall scanning performance, the illumination requirement may present a challenge, since a typical end user, such as a store clerk or customer, of the decodable indicia reading terminal may be accustomed to low intensity light emitted by traditional laser-based scanners, and hence presence of additional intense light source may cause end user's distraction resulting in reduced customer satisfaction.

Referring now to FIGS. 1 and 1A, in one embodiment, the decodable indicia reading terminal 10 may include an illumination assembly 134 (shown in FIG. 4) that may comprise an illumination light bar 136 for generating an illumination pattern substantially corresponding to the field of view of the image sensor assembly 100, and an indicator light bar 138. Each of illumination light bar 136 and indicator light bar indicator light bar 138 may include one or more LEDs. The illumination assembly 134 (shown in FIG. 4) comprising illumination light bar 136 and indicator light bar indicator light bar 138 may be controlled by an illumination assembly control circuit 146.

The ON/OFF state and color of the indicator light bar may reflect the state of the decodable indicia reading terminal. In one embodiment, the indicator light bar may remain lit whenever the bi-optic scanner is powered on. In one embodiment, the state and/or color of the indicator light bar may change responsive to scanning decodable indicia (e.g., a bar code). In one example, the indicator light bar may constantly emit red light to indicate the powered state of the bi-optic scanner, and may switch to blinking red light responsive to scanning decodable indicia. A skilled artisan would appreciate the fact that other modes of indicator light bar functioning are within the scope of this disclosure.

In one embodiment, the illumination light source may be "camouflaged" by locating the illumination light bar 136 spatially close to the indicator light bar 138 which already exists in a typical laser scanner-based system, as best viewed in FIGS. 1 and 1A. The optics 141 which in one embodiment may be incorporated in the light bar housing 143 may include both diffusing and directing optical properties.

In a further aspect, the light bar optics 141 may diffuse the light emitted by the light bars 136, 138 across the horizontal surface 145 of the decodable indicia reading terminal's housing 8. In one embodiment, the face of the horizontal surface 145 may be textured in order to further diffuse and soften the light emitted by the light sources 136.

Still referring to FIG. 1, indicia reading terminal 10 may include a platter 200 with a texturized surface 202. Platter 200 may be configured to reduce, inhibit and/or diffuse the light that is reflected from the upper surface of platter 200 toward a user, e.g., when scanning products or substrates having a barcode. In current applications, light from illumination light bar 136, ambient light, or other light may be reflected by platter 200 in a manner that is unfavorable. More specifically, a glare, stretching of an image that may appear as, for example, a racing stripe, or other diffraction pattern may be produced, and have a distracting or otherwise unpleasant effect on a clerk, customer, or other end user. This effect may result in eye fatigue or have other negative consequences.

Texturized surface 202 may have brush strokes in a particular direction formed thereon. Typically, products or substrates having an indicia are moved or passed by a scanner in a particular direction; the direction of movement may be from a first end 210 of platter 200 to a second end 212 of platter 200. In current applications, the brush strokes are oriented in the same direction of movement that products are moved in to be scanned. This may result in an unfavorable reflection of a light source such as the illumination light bar and/or ambient light. The reflection may appear to the user as a racing stripe or another undesired image.

According to other aspects, texturized surface 202 may be roughened using other means, such as, for example, sand or bead blasting. When roughened, texturized surface 202 may have a satin texture with no direction or orientation to the texture. As a result, any reflection on texturized surface 202 of platter 200 is reduced due to a greater diffusion of the illumination light.

In still other aspects, texturized surface 202 may be brushed in an orbital, circular, or other nonlinear pattern. Brushing in this manner may yield brush patterns in all directions, preserve the shine of platter 200, reduce the glare and reflection of light of texturized surface 202, and camouflage scratches that occur during normal use and wear.

Texturized surface 202 may be peened by a means known in the art to add a texture to platter 202. Where texturized surface 202 is peened, the surface of the platter may scatter the reflected illumination in various directions thereby reducing the light reflected to the user or in any particular direction. Therefore, any material may be used for platter 200. In embodiments where texturized surface 202 is peened, the alteration to the surface may be slight such that liquid is unable to pool on texturized surface 202. In alternative aspects, alternative microtextures may be applied to texturized surface 202. By texturing texturized surface 202, the noise and false edge transition from vertical laser scanning may be reduced. In additional embodiments, a mat or other transportable device may be provided for table top applications with glare for any type of scanning device.

In one embodiment, the texturized surface 202 and platter 200 may be disposed on horizontal surface 145. In another embodiment, texturized surface 202 and platter 200 may be disposed on vertically-disposed housing portion 1018. These embodiments should not be considered limiting as texturized surface 202 and platter 200 may be arranged to reduce the amount of light perceived.

In one embodiment, the decodable indicia reading terminal may further comprise an additional set of light bar optics 147 provided by cylindrical or wedge shaped lenses that may further disperse the light emitted by the light sources 136, 138 across the horizontal surface 145, so that any observable side view of the light emitted by the light sources 136, 138 would be perceived as the indicating light.

In a further aspect, the illumination light source 136 may emit light of the red spectrum region, where the human eye is less responsive as compared to the green spectrum region. In one embodiment, the indicating light source 138 and the illumination light source 136 may emit light of the same wavelength, so that the color of the illumination light emitted by the illumination light source 136 could not be distinguished by the user of the decodable indicia reading terminal from the color of the indicating light emitted by the indicating light source 138.

In a further aspect, the illumination light LEDs may be pulsed with a pre-defined frequency in order to shorten the LED duty cycle. In one embodiment, the frequency of illumination pulses may be equal to the imager frame rate. In a further aspect, the pulse duration may be minimized. In one embodiment, the pulse duration may be equal to the imager integration time. In another embodiment, the pulse duration may be shorter than the imager integration time. In a yet another embodiment, the pulse duration may be shorter than a typical human eye integration time. In an illustrative embodiment, the illumination pulse frequency may be 60 cycles per second, each pulse having duration of 100 µs, thus producing a duty cycle of approximately 1.5%.

While the present invention has been described with reference to a number of specific embodiments, it will be understood that the true spirit and scope of the invention should be determined only with respect to claims that may be supported by the present specification. Further, while in numerous cases herein wherein systems and apparatuses and methods are described as having a certain number of elements it will be understood that such systems, apparatuses and methods may be practiced with fewer than the mentioned certain number of elements. Also, while a number of particular embodiments have been described, it will be understood that features and aspects that have been described with reference to each particular embodiment may be used with each remaining particularly described embodiment.

The invention claimed is:

1. A decodable indicia reading terminal for reading a substrate bearing decodable indicia comprising:
   an imager-based scanner disposed within a housing, said imager-based scanner including a multiple pixel image sensor, and an imaging lens configured to focus an image of the decodable indicia on the image sensor;
   a platter on said housing, said platter having a texturized surface; and
   wherein the texturized surface of said platter reduces the amount light being perceived when the light is reflected from said texturized surface compared to said platter comprising a brushed surface aligned in a substrate motion direction.

2. The decodable indicia reading terminal of claim 1 wherein said imager-based scanner further comprises:
   an analog-to-digital converter configured to convert an analog signal into a digital signal read out of the image sensor, the analog signal representative of light incident on the image sensor and the digital signal representative of the analog signal; and
   a central processing unit configured to output a decoded message data corresponding to the decodable indicia by processing the digital signal.

3. The decodable indicia reading terminal of claim 1 wherein the texturized surface is sand blasted.

4. The decodable indicia reading terminal of claim 1 wherein the texturized surface is bead blasted.

5. The decodable indicia reading terminal of claim 1 wherein the texturized surface is orbitally brushed.

6. The decodable indicia reading terminal of claim 1 wherein the texturized surface is microtextured.

7. The decodable indicia reading terminal of claim 1 wherein the texturized surface is peened.

8. The decodable indicia reading terminal of claim 7 wherein the texturized surface inhibits liquid pooling.

9. The decodable indicia reading terminal of claim 1, further comprising:
   an illumination assembly, configured to generate an illumination having a high intensity for illumination of the substrate bearing decodable indicia, the high intensity generated by a first light having a first wavelength.

10. The decodable indicia reading terminal of claim 9, the illumination assembly further comprising:
    an indicator light bar configured to emit a second light having a second wavelength; and
    wherein the second wavelength is substantially equal to the first wavelength.

11. A decodable indicia reading terminal for reading a substrate bearing decodable indicia comprising:
    a laser-based scanner disposed within a housing, said laser based scanner including a laser source configured to emit a laser beam onto the substrate bearing decodable indicia, a photo-detector configured to receive a second beam of a variable intensity reflected by the decodable indicia and to output a first analog signal representative of the variable intensity, and a first analog-to-digital converter configured to convert the first analog signal into a first digital signal representative of the first analog signal;
    an imager-based scanner disposed within the housing, said imager-based scanner including a multiple pixel image sever sensor, an imaging lens configured to focus an image of the decodable indicia on the image sensor, and a second analog-to-digital converter configured to convert a second analog signal into a second digital signal read out of the image sensor, the second analog signal representative of light incident on the image sensor and the second digital signal representative of the second analog signal;
    a central processing unit configured to output a decoded message data corresponding to the decodable indicia by processing at least one of the first digital signal or the second digital signal;
    a platter on said housing, said platter having a texturized surface; and
    wherein the texturized surface of said platter reduces the amount of light being perceived when the light is reflected from said texturized surface compared to said platter comprising a brushed surface aligned in a substrate motion direction.

12. The decodable indicia reading terminal of claim 11 wherein the texturized surface is sand blasted.

13. The decodable indicia reading terminal of claim 11 wherein the texturized surface is bead blasted.

14. The decodable indicia reading terminal of claim 11 wherein the texturized surface is orbitally brushed.

15. The decodable indicia reading terminal of claim 11 wherein the texturized surface is microtextured.

16. The decodable indicia reading terminal of claim 11 wherein the texturized surface is peened.

17. The decodable indicia reading terminal of claim 16 wherein the texturized surface inhibits liquid pooling.

18. The decodable indicia reading terminal of claim 11, further comprising:
    an illumination assembly, configured to generate an illumination having a high intensity for illumination of the substrate bearing decodable indicia, the high intensity generated by a first light having a first wavelength.

19. The decodable indicia reading terminal of claim 18, the illumination assembly further comprising:
    an indicator light bar configured to emit a second light having a second wavelength; and
    wherein the second wavelength is substantially equal to the first wavelength.

* * * * *

UNITED STATES PATENT AND TRADEMARK OFFICE
CERTIFICATE OF CORRECTION

PATENT NO. : 8,387,882 B2  
APPLICATION NO. : 13/178465  
DATED : March 5, 2013  
INVENTOR(S) : Kearney et al.

Page 1 of 1

It is certified that error appears in the above-identified patent and that said Letters Patent is hereby corrected as shown below:

In the Claims:

Column 10, Line 15: Claim 11 Delete "sever"

Signed and Sealed this  
Thirtieth Day of April, 2013

Teresa Stanek Rea  
*Acting Director of the United States Patent and Trademark Office*